US011027276B2

(12) United States Patent
Dorrer et al.

(10) Patent No.: US 11,027,276 B2
(45) Date of Patent: Jun. 8, 2021

(54) FILM BAG FOR A MICROFLUIDIC ANALYSIS SYSTEM, MICROFLUIDIC ANALYSIS SYSTEM, METHOD FOR PRODUCING AND METHOD FOR OPERATING A MICROFLUIDIC ANALYSIS SYSTEM

(71) Applicant: Robert Bosch GmbH, Stuttgart (DE)

(72) Inventors: Christian Dorrer, Winnenden (DE); Daniel Czurratis, Korntal-Muenchingen (DE); Jochen Rupp, Stuttgart (DE); Karsten Seidl, Gerlingen (DE); Thomas Brettschneider, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 15/379,062

(22) Filed: Dec. 14, 2016

(65) Prior Publication Data
US 2017/0173581 A1    Jun. 22, 2017

(30) Foreign Application Priority Data
Dec. 18, 2015    (DE) ...................... 10 2015 225 837.8

(51) Int. Cl.
*B01L 3/00*    (2006.01)
*G01N 35/10*    (2006.01)

(52) U.S. Cl.
CPC ..... *B01L 3/50273* (2013.01); *B01L 3/502707* (2013.01); *B01L 3/502715* (2013.01); *B01L 3/52* (2013.01); *B01L 3/523* (2013.01); *B01L 3/527* (2013.01); *B01L 2200/027* (2013.01); *B01L 2200/12* (2013.01);
(Continued)

(58) Field of Classification Search
CPC .......... B01L 2200/16; B01L 2300/123; B01L 2400/0481; B01L 3/502715; B01L 2200/0689; B01L 2200/027; B01L 3/502707; B01L 3/50273; B01L 3/52
See application file for complete search history.

(56) References Cited

U.S. PATENT DOCUMENTS 10,166,544 B2 *   1/2019   Beyl ................. B01L 3/502715
2007/0119862 A1   5/2007   Backes et al.
(Continued)

FOREIGN PATENT DOCUMENTS

CN    104399540 A    3/2015
DE    93 12 427 U1   10/1993
(Continued)

*Primary Examiner* — Lyle Alexander
*Assistant Examiner* — Bryan Kilpatrick
(74) *Attorney, Agent, or Firm* — Maginot, Moore & Beck LLP

(57) ABSTRACT

A film bag for a microfluidic analysis system includes a film bag bottom, a film bag opening arranged opposite the film bag bottom, and a peel seam arranged between the film bag bottom and the film bag opening. The peel seam is formed to produce a closed reagent receiving region between the peel seam and the film bag bottom and a tube between the peel seam and the film bag opening. The reagent receiving region has a reagent receiving length extending between the peel seam and the film bag bottom. The tube has a tube length extending between the peel seam and the film bag opening. The tube length is at least five percent of the reagent receiving length.

19 Claims, 8 Drawing Sheets

(52) U.S. Cl.
CPC ..... *B01L 2200/16* (2013.01); *B01L 2300/087* (2013.01); *B01L 2300/0809* (2013.01); *B01L 2300/123* (2013.01); *B01L 2400/0481* (2013.01); *B01L 2400/0683* (2013.01); *G01N 35/1002* (2013.01)

(56) References Cited

U.S. PATENT DOCUMENTS

| | | | |
|---|---|---|---|
| 2015/0016757 A1 | 1/2015 | Kogure | |
| 2015/0314924 A1* | 11/2015 | Hortig | B01L 3/502715 383/200 |
| 2017/0014825 A1* | 1/2017 | Beyl | B01L 3/502715 |

FOREIGN PATENT DOCUMENTS

| | | | | |
|---|---|---|---|---|
| DE | 199 03 704 C1 | 11/2000 | | |
| DE | 100 41 295 A1 | 3/2002 | | |
| DE | 10 2007 059 533 A1 | 6/2009 | | |
| DE | 10 2008 063 592 A1 | 6/2010 | | |
| DE | 10 2012 222 719 A1 | 6/2014 | | |
| DE | 10 2014 202 590 A1 | 8/2015 | | |
| JP | 2010-89739 A | 4/2010 | | |
| JP | 2010-89793 A | 4/2010 | | |
| WO | 2008/043375 A1 | 4/2008 | | |
| WO | 2014/090610 A1 | 6/2014 | | |
| WO | WO-2014090610 A1 * | 6/2014 | ........ B01L 3/502715 |
| WO | WO-2015121034 A1 * | 8/2015 | ........ B01L 3/502715 |

* cited by examiner

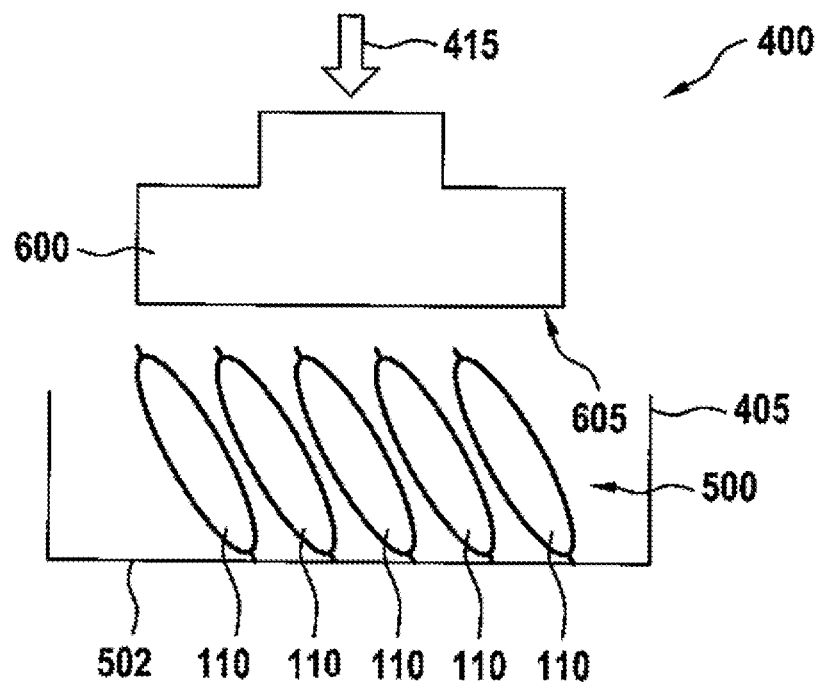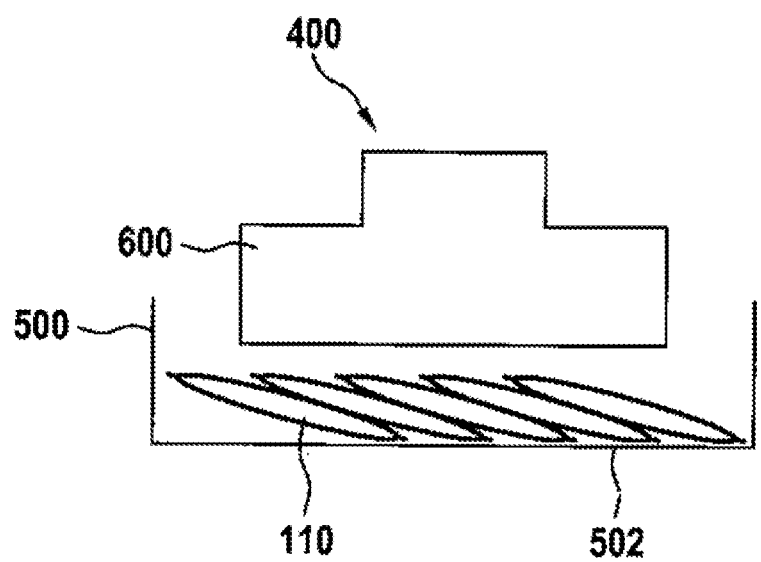

FILM BAG FOR A MICROFLUIDIC ANALYSIS SYSTEM, MICROFLUIDIC ANALYSIS SYSTEM, METHOD FOR PRODUCING AND METHOD FOR OPERATING A MICROFLUIDIC ANALYSIS SYSTEM

This application claims priority under 35 U.S.C. § 119 to patent application no. DE 10 2015 225 837.8, filed on Dec. 18, 2015 in Germany, the disclosure of which is incorporated herein by reference in its entirety.

BACKGROUND

In analysis systems which are used, for example, for medical diagnostics, environmental analysis or process control, there is frequently the need to store fluids, such as liquid reagents. The latter may be, for example, aqueous solutions, buffers or alcohol-containing solutions. The analysis systems can be, for example, Lab-on-Chip (LOC) systems, i.e. microfluidic systems, in which an analysis proceeds in an automated manner. LOC systems are generally designed as disposables. For the storage of reagents in LOC systems, called microfluidic analysis systems, or analysis systems for short, below, film bags or thermofilms or blisters, for example, are known.

WO2014/090610 A1 describes a film bag for storing a fluid and a device for providing a fluid.

SUMMARY

Against this background, the approach presented here proposes a film bag for a microfluidic analysis system, a microfluidic analysis system, furthermore a method for producing and a method for operating a microfluidic analysis system. By means of the measures cited in the dependent claims, advantageous developments and improvements of the film bag and of the microfluidic analysis system are possible.

A presented film bag can store a fluid such that the fluid can be released in a targeted manner in a microfluidic analysis system. A presented microfluidic analysis system manages here with a little requirement of space for the film bag without the film bag taking up a lot of area on the analysis system.

A film bag for a microfluidic analysis system is presented, comprising the following features:
 a film bag bottom;
 a film bag opening arranged opposite the film bag bottom; and a peel seam which is arranged between the film bag bottom and the film bag opening and is formed to produce a closed reagent receiving region between the peel seam and the film bag bottom and a tube between the peel seam and the film bag opening, wherein the reagent receiving region has a reagent receiving length extending between the peel seam and the film bag bottom, and the tube has a tube length extending between the peel seam and the film bag opening which is at least five percent of the reagent receiving length.

The reagent receiving region can be filled with a fluid, in particular a liquid. The peel seam is designed to be released at a predetermined pressure on the reagent receiving region filled with fluid. The peel seam can therefore be understood to be a releasable seam. A ratio between the reagent receiving length and the tube length can be selected such that the reagent receiving length is many times longer than the tube length. A value of the tube length can accordingly be at least five percent of a value of the reagent receiving length.

According to various embodiments, the tube length can also be, for example, at least ten, twenty, thirty, forty or fifty percent of the reagent receiving length. The film bag bottom can be produced by folding a film of the film bag or can be produced by a sealing seam, by means of which two films or film portions are connected to each other.

An approach presented here creates the advantage that the fluid, such as, for example, a reagent, can be stored in a leakproof manner in the film bag formed, for example, as a reagent container and, when required, can be released in a targeted manner via the tube by means of the pressure on the reagent receiving region. The fluid, for example the reagent, can be securely stored in a manner integrated in the film bag in order to avoid manual filling of the analysis system and therefore to simplify use and to exclude misoperation and the risk of contaminations. When required, a targeted, automated release of the fluid for beginning the analysis is possible via the tube.

The film bag can have at least one fluid-tight boundary line connecting the film bag bottom to the film bag opening. A boundary line can be produced, for example, by a tightly closing sealing seam which connects together two films or portions of the film bag that lie on each other. By means of a sealing seam, a tubular film bag, for example, can be realized. The boundary line is designed not to be released or burst open at a predetermined pressure on a fluid-filled reagent receiving region of the film bag.

In a general form, the boundary line can also be considered to be an imaginary line between the film bag bottom and the film bag opening. This can be the case, for example, in a film bag formed without a seam.

According to an embodiment, the film bag can have two fluid-tight boundary lines arranged opposite each other. One of the boundary lines can be produced here by a folding line and the other of the boundary lines by a sealing seam. The two boundary lines can also be produced by a sealing seam, for example if the film bag is produced from two films lying one on the other. A sealing seam used for forming the boundary line can lie here on the lateral edge of two film portions lying one on the other, or can be arranged at a distance from such an edge.

According to an embodiment, at least one further boundary line which runs between, for example centrally between, the two boundary lines already mentioned can be provided. In this manner, the reagent receiving region and the tube can be divided into two portions which are fluidically separated from each other. The film bag can also have two boundary lines designed as folding lines and a boundary line which is arranged between the folding lines and is designed as a sealing seam.

A width of a boundary line can be defined by a width of a sealing seam or folding line forming the boundary line.

A width of the at least one boundary line can be identical in the region of the tube and in the reagent receiving region. In a simplest embodiment, the at least one boundary line can also be of completely identical design in the region of the tube and in the reagent receiving region. As a result, the film bag can be produced cost-effectively.

Alternatively, a width of at least one of the boundary lines in the region of the tube can be wider than a width of said boundary line in the reagent receiving region. As a result, the dead volume of the tube can turn out smaller than the dead volume of the reagent receiving region. Less fluid can thereby remain in the tube during emptying, which permits complete emptying of the reagent receiving region.

According to an embodiment, the can have a length of between one or two and forty millimeters. The reagent receiving length can have a length of between five and one hundred millimeters. The tube length can have a length of between two and one hundred millimeters. The at least one boundary line can have a width of between two hundred micrometers and twenty millimeters in the region of the tube. The dimensions referred to can create a film bag which can receive an expedient fluid volume, wherein the film bag, for example in an upright position, is ideally suitable for space-saving accommodation in a microfluidic analysis system.

A fluid which is stored for future use in the reagent receiving region can be accommodated in the reagent receiving region. For example, the fluid may have been poured into the film bag before the peel seam is produced.

A microfluidic analysis system comprises a container with at least one first tube chamber and an adjacently arranged second tube chamber and at least one first film bag and an adjacently arranged second film bag. At least one subsection of the tube of the first film bag, which subsection surrounds the film bag opening, is accommodated by the first tube chamber, and at least one subsection of the tube of the second film bag, which subsection surrounds the film bag opening, is accommodated by the second tube chamber. The reagent receiving region of the first film bag and the reagent receiving region of the second film bag are arranged here outside the first and the second tube chambers.

A described analysis system has the advantage that the fluid accommodated, for example, in the reagent receiving region, after a possible release, cannot only be conducted in a targeted manner via the tube, but can also be securely collected by the tube chambers of the container. Release of the fluid to the outside can be avoided here. It is also possible, for example, to already store a further fluid in the tube chambers of the container, which further fluid, after release of the fluid in the reagent receiving region, is intended to mix with the released fluid.

It is of advantage if the analysis system, according to an embodiment, has a further film bag and a further tube chamber. The further film bag can be arranged here between the first and the second film bag, and the further tube chamber can be arranged between the first and the second tube chamber, wherein at least one subsection of the tube of the further film bag, which subsection surrounds the film bag opening, can be accommodated by the third tube chamber. The tube length of the further film bag can have a shorter length than the tube length of the first film bag and the tube length of the second film bag.

By the tubes of the film bags located in the outer region of the analysis system being designed to be longer than the tube of the film bag located in the center, it can be ensured that, during a common emptying operation, all of the tubes remain arranged in their designated tube chambers and do not jump out of the tube chambers. An anticipated pressure on the reagent receiving regions for emptying the reagent receiving regions can namely have the effect that the tubes of the outer film bags move to a greater extent outwards during the pressure operation than the tube of an inner film bag that is moved to a relatively small extent by the pressure.

The analysis system can be extended to any desired extent by means of additional film bags and correspondingly arranged additional tube chambers in the container. It is of advantage here to note that a length of the tubes increases towards the outside, wherein a length of the tubes of inner film bags can be formed to be shorter.

The analysis system can have a punch device which is designed to exert a force on at least one of the reagent receiving regions, wherein the force is designed to build up a pressure, which is suitable for releasing the peel seam, in the interior of the reagent receiving region, as a result of which the at least one fluid can flow through the at least one tube into the at least one tube chamber. A punch device can have the effect, for example by the use of a punch and optionally a suitable mechanism, that the fluid is squeezed out of the reagent receiving region for further use and is therefore released.

It is furthermore of advantage if the container has a storage chamber with a bottom and a punch opening, which is arranged opposite the bottom, for the introduction of a punch of a punch device. The tube chambers can lead into the storage chamber via connecting openings. The reagent receiving regions can be arranged standing next to one another obliquely with respect to the bottom within the storage chamber. A described arrangement of the film bags in a storage chamber, which is formed, for example, in the shape of a box, permits the film bags to be squeezed out by a punch which acts on the reagent receiving regions from above and which can be matched, for example, to the shape of the box. The film bags can be kept in their position by the storage chamber during the squeezing-out operation. The arrangement of connecting openings which are formed, for example, especially to the dimensions of the tubes and lead from the storage chamber into the tube chambers affords the advantage that the tube chambers can be formed to be very substantially closed, and therefore the accommodated fluid cannot flow back or cannot spray out of the tube chambers again on flowing into the latter. The connecting openings can be formed, for example, as slots in a wall, which is opposite a tube chamber bottom, of the respective tube chamber, wherein the slots can accommodate at least a subsection of the tube.

According to a further embodiment, the analysis system can have an elastic membrane which is formed to close the punch opening. A described approach with the membrane makes it possible for the fluid, even during the release of the fluid from the reagent receiving region, to always be able to remain fluidically sealed, according to an embodiment hermetically, separately from the punch device. The membrane can be formed for this purpose in order, for example when being pressed in by, for example, the punch, to be placed from a lower side of the punch around the contours of the punch and, as a result, not to obstruct the punch operation in any respect. The membrane can therefore permit a particularly hygienic variant for emptying the reagent receiving regions.

A method for producing a microfluidic analysis system has the following steps: providing the container with at least the first tube chamber and the second tube chamber;

providing at least the first film bag and the second film bag; and arranging the two film bags adjacent to each other, wherein at least one subsection of the first tube which surrounds the first film bag opening is accommodated by the first tube chamber, and at least one subsection of the second tube which surrounds the second film bag opening is accommodated by the second tube chamber, wherein the first reagent receiving region of the first film bag and the second reagent receiving region of the second film bag are arranged outside the first and the second tube chamber.

A method for operating a microfluidic analysis system has the following steps:

exerting a force on at least one of the reagent receiving regions to build up a pressure, which is suitable for releasing the peel seam, in the interior of the reagent receiving region, as a result of which the at least one fluid can flow through the at least one tube into the at least one tube chamber.

The force can be exerted using a mechanical punch, but also, in a further embodiment, by deflection of a membrane by means of compressed air.

BRIEF DESCRIPTION OF THE DRAWINGS

Exemplary embodiments of the disclosure are illustrated in the drawings and explained in more detail in the description below. In the drawings:

FIG. 6 shows a schematic cross section of an analysis system according to an exemplary embodiment;

FIG. 7 shows a schematic cross section of an analysis system according to an exemplary embodiment;

DETAILED DESCRIPTION

In the description below of advantageous exemplary embodiments of the present disclosure, identical or similar reference signs are used for the elements which are illustrated in the various figures and act in a similar manner, wherein a repeated description of said elements is dispensed with.

Figure 1:
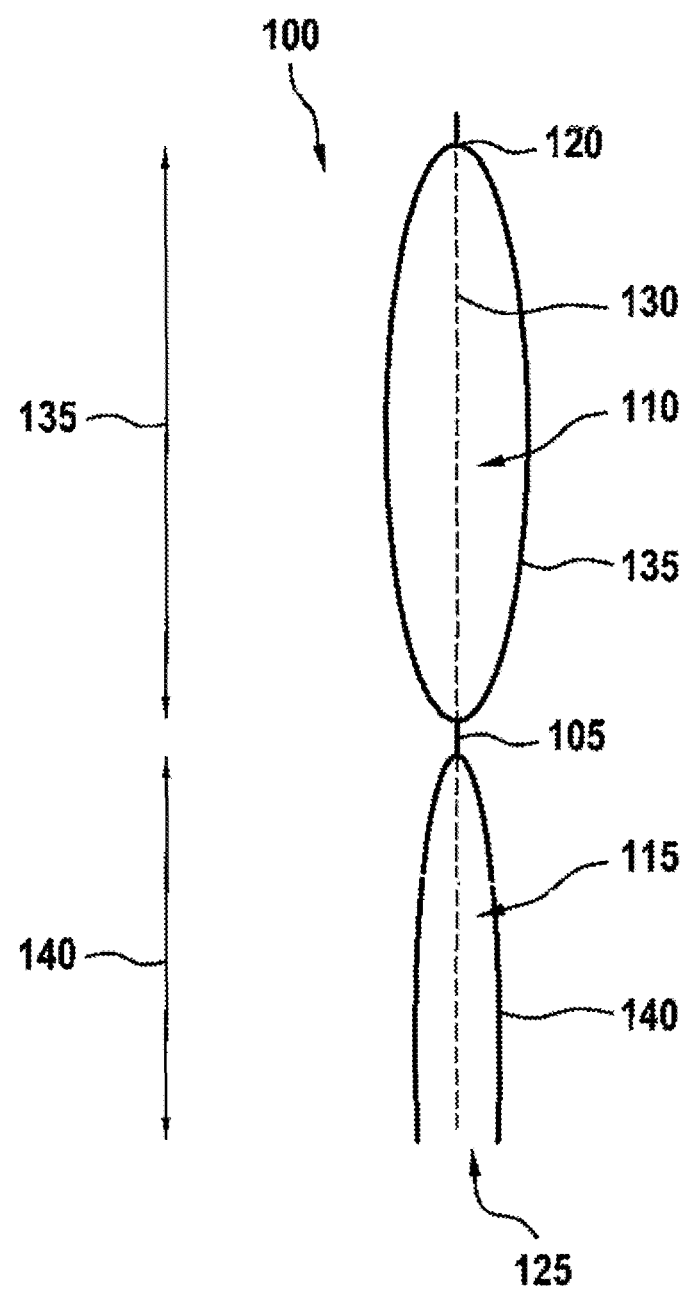
FIG. 1 shows a schematic cross section of a film bag according to an exemplary embodiment.

FIG. 1 shows a schematic cross section of a film bag 100 according to an exemplary embodiment. The film bag 100 is formed from a film. According to the exemplary embodiment shown, the film is folded along a folding edge and film portions lying one on the other of the film turned over at the folding edge are connected together by a sealing seam. The film bag 100 can also be formed by two films which are placed one on the other and are connected together by two opposite sealing seams.

The film bag 100 is divided by a peel seam 105 into a reagent receiving region 110 and a tube 115. The reagent receiving region 110 is closed on a side facing away from the tube by a film bag bottom 120. The tube 115 has a film bag opening 125 on a side facing away from the reagent receiving region 110. The two boundary lines 130 which, as already described, can be produced by a sealing seam and/or by a fold run between the film bag bottom 120 and the film bag opening 125.

Portions of the boundary lines 130 that are arranged in the reagent receiving region 110 have a reagent receiving length 135. Portions of the boundary lines 130 that are arranged in the region of the tube 115 have a tube length 140. The tube length 140 has a length of at least five percent of the length of the reagent receiving length 135. According to the exemplary embodiment shown, the tube length 140 is more than half the length of the reagent receiving length 135.

Adjacent to the predetermined breaking point 105, i.e. adjacent to the peel seam 105, the film bag 100 has a tubular extension in the form of the tube 115. If a fluid is accommodated in the reagent receiving region 110, a targeted control of a fluid flow escaping from the film bag 100 is possible by means of the film bag 100. This extended film bag 100 can be produced in the same production process as conventional film bags 100; a production process of this type is explained with reference to FIG. 2.

Figure 2:
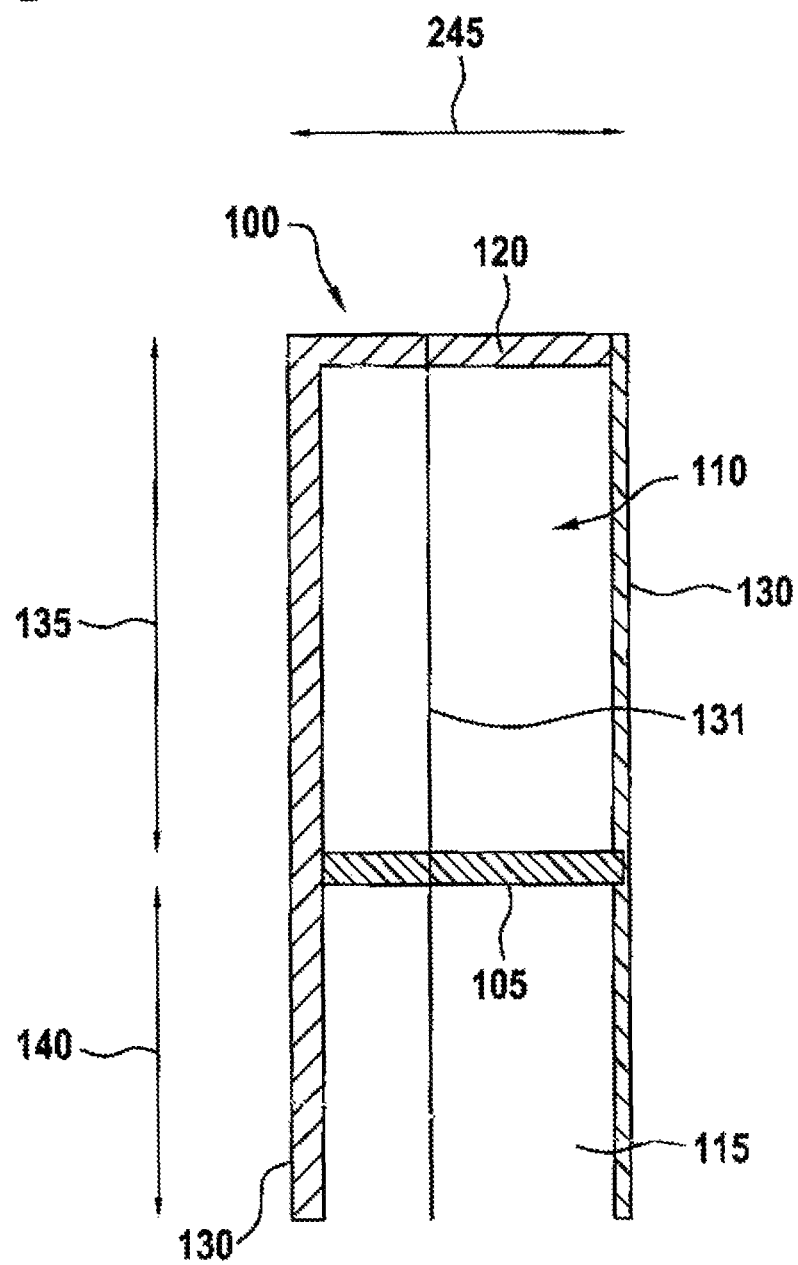
FIG. 2 shows a schematic cross section of a film bag according to an exemplary embodiment.

FIG. 2 shows a schematic cross section of a film bag 100 according to an exemplary embodiment. This may be the film bag 100 which is described with reference to FIG. 1. The film bag 100 has two mutually opposite boundary lines 130, a film bag bottom 120 and a peel seam 105. A first of the boundary lines 130 and the film bag bottom 120 have a sealing seam or are formed by such a sealing seam. The second of the boundary lines 130 is formed by a fold, along which a film from which the film bag 100 is produced is folded. According to an alternative exemplary embodiment, the second of the boundary lines 130 is likewise formed by a sealing seam. The peel seam 105 runs transversely between the boundary lines 130. According to the exemplary embodiment shown, the boundary lines 130 and the film bag bottom 120 run along edges of the film bag 100 and close off an interior space of the film bag 100 towards three sides. The film used for the film bag 100 can extend beyond at least one of the boundary lines 130 and/or the bottom.

According to an exemplary embodiment, at least one further boundary line 131 which runs between the boundary lines 130 is optionally provided. Such a further boundary line can divide the reagent receiving region 110 and the tube 115 into two chambers each. The further boundary line 131 is formed, for example, by a sealing seam. The further boundary line 131 can run centrally or eccentrically between the boundary lines 130. What are referred to as tubular bags (stick packs) can be produced by such a further boundary line 131.

If the further boundary line 131, which is designed as a sealing seam, does not connect front side and rear side of the film bag 100 to each other, said sealing seam can serve for forming a film bag 100 in which the boundary lines 130 constitute folding lines or merely imaginary side lines of a tubular film bag 100.

According to this exemplary embodiment, the film bag 100 has a structure which is formed by the fact that the film, here a sealing film, is folded along an edge and sealed with a sealing seam.

The final open side of the film bag 100 is bounded by the peel seam 105. For opening purposes, the film bag 100 is placed under pressure, the peel seam 105 is delaminated and liquid accommodated in the reagent receiving region 110 is released. The sealing film can be, for example, composite polymer films composed of polymeric sealing and protective layers, for example PE, PP, PA, PET, and barrier layers, generally vapor deposited aluminum, but also other high barrier layers, such as EVOH, BOPP.

An extended film bag 100 illustrated according to this exemplary embodiment has the downwardly open tubular extension 115, i.e. the tube 115, in the position, shown in FIG. 2, of the film bag 100 below the peel seam 105. By means of the tube 115, the released liquid can be conducted in a targeted manner into certain regions, optionally using gravity. Furthermore, the tube 115 avoids liquids, in particular liquids with a low surface tension, creeping upwards along the outside of the film bag 100.

According to an exemplary embodiment, the film bag 100 has an overall length of less than 150 millimeters and a width 245 of less than 40 millimeters. For example, the film bag bottom has a length, corresponding to the width 245, of five to twenty millimeters, the reagent receiving length 135 has a length of ten to fifty millimeters and the tube length 140 has a length of five to fifty millimeters.

Figure 3:
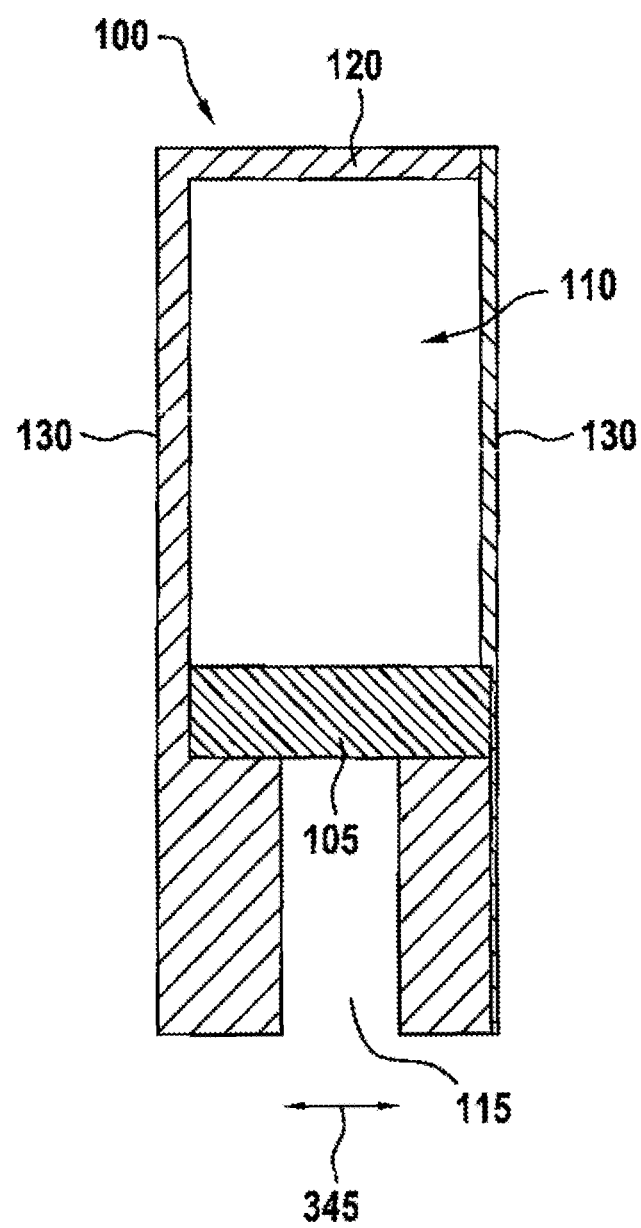
FIG. 3 shows a schematic cross section of a film bag according to an exemplary embodiment.

FIG. 3 shows a schematic cross section of a film bag 100 according to an exemplary embodiment. This may be the film bag 100 described with reference to FIG. 2, with the difference that, according to this exemplary embodiment, the second of the boundary lines 130 in the region of the tube 115 likewise has a sealing seam, and the sealing seams of the boundary lines 130 in the region of the tube 115 and the peel seam 105 are formed wider than the sealing seams of the first boundary line 130 and of the film bag bottom 120 in the region of the reagent receiving region 110.

According to an exemplary embodiment, the boundary lines 130, which are formed as sealing seams or folding lines, in the region of the tube 115 have a width which is at least twice as wide as the sealing seam of the first boundary line 130 in the region of the reagent receiving region 110. For example, the boundary lines 130 in the region of the tube 115 have a width of five hundred micrometers to ten millimeters.

If the film bag 100 has only a single boundary line 130, the abovementioned dimensions and/or ratios according to an embodiment apply in a corresponding manner to this one boundary line 130.

For example, the tube 115 can thereby have an unsealed region with a width 345 of between 500 μm to 10 mm. The width 345 of the unsealed region of the tube 115 is less than the width of the unsealed region of the reagent receiving region 110. For example, the width 345 of the unsealed region of the tube 115 is less than two thirds or less than half of the width of the unsealed region of the reagent receiving region 110.

According to an exemplary embodiment, only one of the boundary lines 130 in the region of the tube 115 has a sealing seam which is wider than the sealing seam in the reagent receiving region 110.

According to an exemplary embodiment, the peel seam 105 has a width which approximately corresponds to a width of the sealing seam in the reagent receiving region 110.

Figure 4:
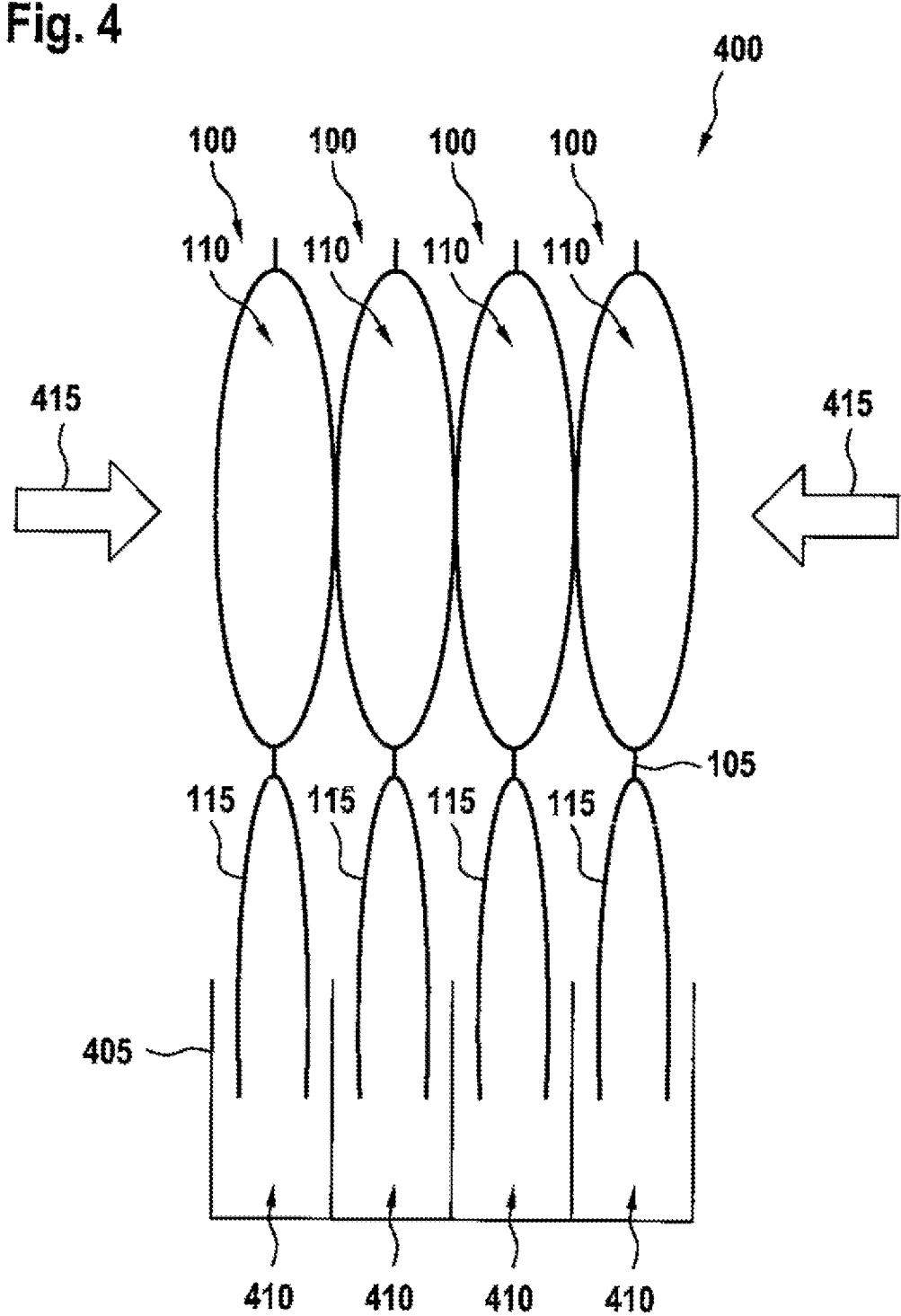
FIG. 4 shows a schematic cross section of a microfluidic analysis system according to an exemplary embodiment.

FIG. 4 shows a schematic cross section of a microfluidic analysis system 400 according to an exemplary embodiment. The microfluidic analysis system 400 has at least two film bags 100 and a container 405 with at least two tube chambers 410. The film bags 100 can be film bags 100 as are described with reference to the preceding figures.

According to this exemplary embodiment, a plurality of film bags 100, here by way of example four film bags 100, are arranged adjacent to one another, wherein the tubes 115 of the film bags 100 are accommodated, at least by a portion having the film bag opening, by the four tube chambers 410 (according to this exemplary embodiment) of the container 405. Each film bag 100 is assigned one of the tube chambers 410 of the container 405.

The reagent receiving regions 110 are arranged outside the tube chambers 410. According to this exemplary embodiment, the reagent receiving regions 110 are arranged in an upright position above the tube chambers 410 and the tubes 115, wherein the tubes 115, in each case hanging downwards, are introduced into the tube chambers 410 through openings in the tube chambers 410.

By exertion of a force 415 on the reagent receiving regions 110 of the film bags 100, the peel seams 105 of the film bags 100 can be severed and the content of the reagent receiving regions 110 pressed into the tubes 115. The force 415 can be applied by a suitable punch device which can have at least one punch, as is shown for example in FIG. 6. Such a punch device has, according to an exemplary embodiment, a mechanism via which the punch is coupled to the container 405.

The essence of this approach is a tightly packed arrangement of a plurality of film bags 100 in a microfluidic analysis system 400, in which the film bags 100 place one another under pressure during the opening operation by a force 415 exerted, according to this exemplary embodiment, in the region of the reagent receiving regions 110 transversely with respect to the boundary lines 130. This concept permits a highly space-saving arrangement of the film bags 100 and at the same time permits controlled emptying of different liquids into separate microfluidic cavities 410 in the form of the tube chambers 410. In addition to little utilization of an area of the film bags 100 on the analysis system 400, advantages are that the film bags 100 can be arranged in a common container 405 on the LOC system 400, i.e. on the analysis system 400. The component in the form of the container 405 can thereby be realized with little complexity and can be produced from a liquid-impermeable material, for example by simple injection molding. The film bags 100 can be opened by a common actuator, for example a punch, or by pneumatic deflection of a membrane for transmitting pressure, which exerts the force 415 on the film bags 100. This permits a simple periphery belonging to the analysis system 400.

The tube chambers 410 can have, for example, a volume of between 100 μL and 5 mL. The described arrangement affords the advantage that, by rotation of the film bags 100 through 90° into the upright position, the requirement for area can turn out to be little. The tubes 115 lead into separate cavities 410 in each case in the form of the tube chambers 410 on the analysis system 400. In order to squeeze out the film bags 100, the force 415 can be exerted, as indicated by the arrows, on the film bags, for example with the punch. The film bags 100 can exert the force 415 on one another here, the force leading to the peel seams 105 breaking open and to the emptying of the liquids into the tube chambers 410. It can be avoided here by the tubes 115 that the liquids come into contact with one another. The force 415 can also be introduced in a different direction, for example in the direction of the plane of the drawing. The tube chambers 410 can be contacted by microfluidic channels through which the liquids can be pumped out depending on requirements. In an advantageous alternative exemplary embodiment, the length of the tubes 115 is not identical, but rather is adapted to the anticipated offset of the tube position by means of the squeezing-out operation. In the case illustrated, for example, it should be anticipated that the two central tubes 115 only change their position a little during the squeezing-out operation, whereas the two outer tubes 115 are displaced during the squeezing-out operation in the direction of the forces 415 acting from the outside. The function of the arrangement is maintained for as long as the lower end of the tubes 115 leads into the associated tube chambers 410 at the end of the squeezing-out operation. Accordingly, it is advantageous to select the length of the outer tubes 115 to be larger than for the inner tubes 115. By this means, firstly, material can be saved on the inner tubes 115 and, secondly, the reliability is increased since slipping of the tubes 115 out of the tube chambers 410 during the squeezing-out operation can be avoided.

Figure 5:
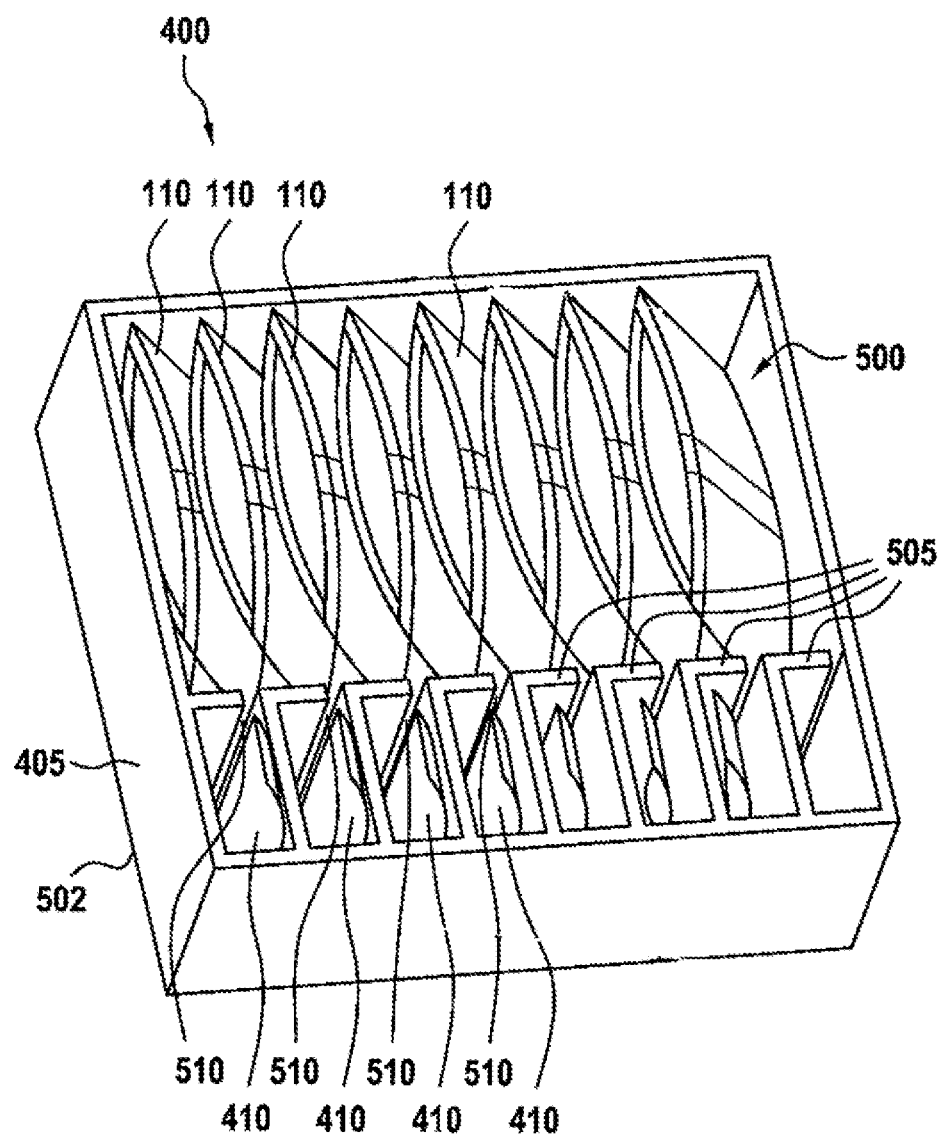
FIG. 5 shows a perspective top view of an analysis system with a storage chamber according to an exemplary embodiment.

FIG. 5 shows a perspective top view of an analysis system 400 with a storage chamber 500 according to an exemplary embodiment. The analysis system 400 here can be the analysis system 400 described with reference to FIG. 4.

According to this exemplary embodiment, the reagent receiving regions 110 of the film bags are accommodated by a microfluidic storage element 500, referred to below as the storage chamber 500. The storage chamber 500 is formed substantially in the shape of a box and has a bottom 502 and two side walls and a rear wall, which are arranged here by way of example perpendicularly to the bottom 502. The rear wall is arranged opposite the tube chambers 410 which lead into the storage chamber 500. The film bags are arranged in the storage chamber 500 in such a manner that the boundary lines are oriented along the side walls. The film bottoms of the film bags are oriented obliquely with respect to the side walls and the bottom (502).

According to this exemplary embodiment, the reagent receiving regions 110 of the film bags 100 are positioned slightly obliquely to the bottom 502, which permits squeezing-out from above, i.e. from a side opposite the bottom 502, for example by means of a punch which applies the force at a right angle to the plane of the drawing, i.e., for example, at a right angle to the bottom 502, or permits complete displacement of the film bag contents by means of the punch. On sides facing the reagent receiving regions 110 of the film bags 100, the tube chambers 410 each have here a wall 505 with a connecting opening 510, formed by, for example, a slot in the wall 505. According to this exemplary embodiment, the connecting openings 510 produce a connection between the storage chamber 500 and the adjacent tube chambers 410. According to this exemplary embodiment, the tubes of the film bags 100 are inserted into the connecting openings 510. By this means, the tubes can be guided particularly securely and slipping-out of the tubes can be avoided.

FIG. 6 shows a schematic cross section of an analysis system 400 according to an exemplary embodiment. This may be the analysis system 400 which is described with reference to FIG. 5, with the difference that the tubes and the tube chambers are not illustrated. An imminent squeezing-out of the reagent receiving regions 110 of the film bags in the storage chamber 500 is illustrated here. For this purpose, a punch 600 is provided, which punch, according to this exemplary embodiment, is arranged suspended above the storage chamber 500, on a side of the storage chamber 500 which faces away from the bottom 502. According to this exemplary embodiment, a lower side 605 of the punch 600, the lower side facing the reagent receiving regions 110, is of flat design or is adapted to a contour of the bottom 502 so that the bottom 502 can receive the punch 600 in a precisely fitting manner and the reagent receiving regions 110 can thus be completely squeezed out. In order to squeeze out the reagent receiving regions 110, the punch 600 is introduced into the storage chamber 500. For this purpose, a punch device can have a suitable guide for guiding the punch 600, said guide being connected to the container 405 or being formed by a structure of the container 405.

FIG. 7 shows a schematic cross section of an analysis system 400 according to an exemplary embodiment. This may be the analysis system 400 described with reference to FIG. 6. The reagent receiving regions 110 of the film bags that were positioned obliquely beforehand according to this exemplary embodiment have been virtually completely emptied according to this exemplary embodiment by means of the punch 600 and rest on the bottom 502. The punch 600 is arranged according to this exemplary embodiment within the storage chamber 500 because of the squeezing-out operation.

Figure 8:
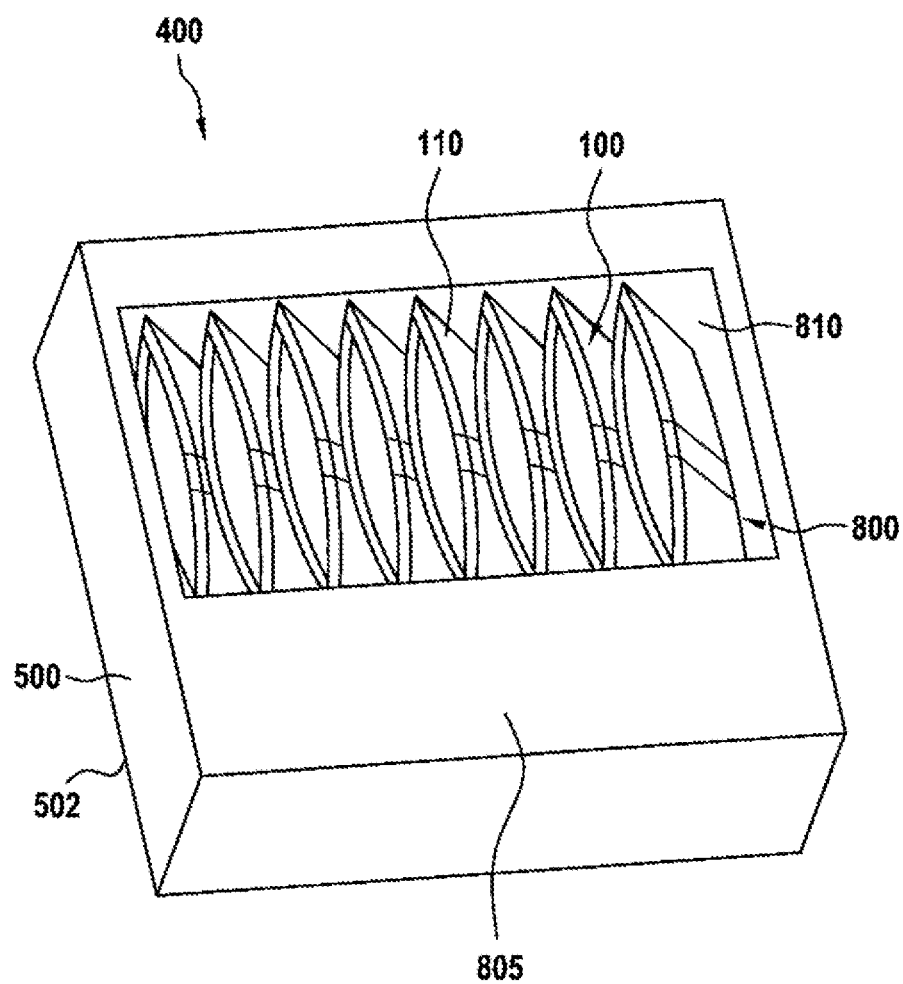
FIG. 8 shows a perspective top view of an analysis system according to an exemplary embodiment.

FIG. 8 shows a perspective top view of an analysis system 400 according to an exemplary embodiment. The analysis system 400 may be the analysis system 400 described with reference to FIG. 5.

According to this exemplary embodiment, the analysis system 400 has a lid 805 with a through-opening 810 which can be closed by a membrane 800.

The lid 805 is arranged on a side of the analysis system 400 that is opposite the bottom 502 and extends over the analysis system 400 together with the storage chamber 500. The tube chambers are closed according to this exemplary embodiment by the lid 805 and are not visible. The lid 805 is arranged, according to this exemplary embodiment, in a manner partially extended over the reagent receiving regions 110 of the film bags 100, wherein the punch opening 810 in the lid 805 is arranged in the region of the reagent receiving regions 110 and provides a passage to an external region of the analysis system 400. According to this exemplary embodiment, the punch opening 810 is formed as a rectangular aperture in the lid 805. The lid 805 only covers the reagent receiving regions 110 on an upper and lower side, i.e. in the region of the film bag bottoms and in the region of the peel seams, in order to prevent the film bags 100 from dropping out or twisting. Alternatively, the punch opening 810 can be arranged in the storage chamber 500, for example in the bottom 502. The film bags 100 can then be squeezed out from a rear side of the storage chamber 500, i.e. from the bottom 502.

According to this exemplary embodiment, the punch opening 810 is closed by a flexible membrane 800 which can be deflected into the storage chamber 500 by the punch when the film bags 100 are being squeezed out. This has the advantage that, during the squeezing-out operation, the punch and the liquids remain hermetically separated from one another and an escape of liquids into the environment can be reliably prevented. Furthermore, for the squeezing-out of the film bags 100, a pneumatic or hydraulic pressure can be exerted, the pressure deflecting the flexible membrane 800 against the film bags 100 and therefore applying the squeezing-out force. In this exemplary embodiment, the space in which the reagent receiving regions 110, which are also referred to as stick packs, are arranged can be ventilated via a channel in order to permit equalization of the pressure.

Alternatively to a deflection by the punch, the membrane 800 can also be deflected by compressed air.

Figure 9:
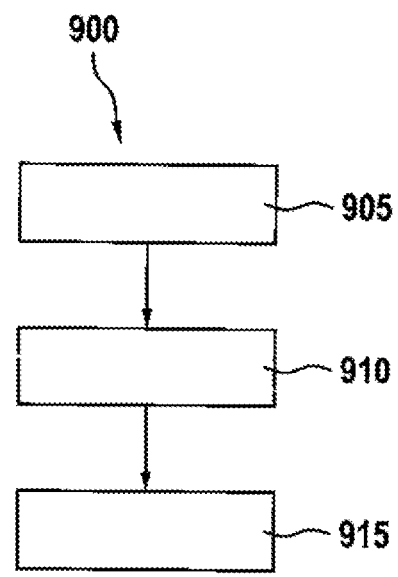
FIG. 9 shows a sequence diagram of a method for producing an analysis system according to an exemplary embodiment.

FIG. 9 shows a sequence diagram of a method for producing 900 an analysis system according to an exemplary embodiment. This may involve one of the analysis systems described with reference to FIGS. 4 to 8. In a providing step 905, the container together with a plurality of tube chambers is provided. In a further providing step 910, a plurality of film bags are provided. In a final arranging step 915, the film bags are arranged adjacent to one another, wherein subsections of the tubes which surround the film bag openings are each accommodated by one of the tube chambers. The reagent receiving regions of the film bags remain here outside the tube chambers.

Figure 10:
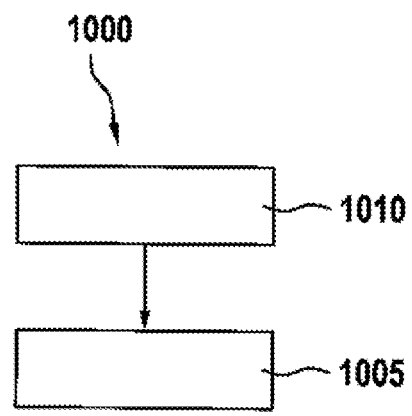
FIG. 10 shows a sequence diagram of a method for providing an analysis system according to an exemplary embodiment.

FIG. 10 shows a sequence diagram of a method for producing 1000 an analysis system according to an exemplary embodiment. This may involve one of the analysis systems described with reference to FIGS. 4 to 8.

In an exerting step 1005, the force is exerted on at least one of the reagent receiving regions, wherein the force is designed to build up a pressure, which is suitable for releasing the peel seam, in the interior of the reagent receiving region, as a result of which the at least one fluid can flow through the at least one tube into the at least one tube chamber. According to an exemplary embodiment, the force is exerted by a punch which is actuated in an optional step 1010. The actuation can be carried out, for example, using a mechanical or electromechanical actuating device.

If an exemplary embodiment comprises an "and/or" linkage between a first feature and a second feature, this can be read to the effect that the exemplary embodiment has both the first feature and the second feature, according to one embodiment, and either only the first feature or only the second feature, according to a further embodiment.

What is claimed is:

1. A film bag for a microfluidic analysis system, comprising:
   a film bag bottom;
   a film bag opening arranged opposite the film bag bottom; and
   a peel seam defining a predetermined breaking point at a location between the film bag bottom and the film bag opening, the peel seam configured to define at least in part (i) a closed reagent receiving region between the peel seam and the film bag bottom, and (ii) a tube region of the film bag located between the peel seam and the film bag opening,
   wherein the film bag is configured such that when a fluid is in the closed reagent receiving region and the peel seam is released at the predetermined breaking point, the closed reagent receiving region is opened at the predetermined breaking point and the fluid is directed from the reagent receiving region through the predetermined breaking point and then through the tube region and then out of the film bag through the film bag opening,
   wherein the reagent receiving region has a reagent receiving length extending between the peel seam and the film bag bottom, and
   wherein the tube region has a tube length extending between the peel seam and the film bag opening, the tube length being at least five percent of the reagent receiving length.

2. The film bag according to claim 1, further comprising at least one fluid-tight boundary line connecting the film bag bottom to the film bag opening.

3. The film bag according to claim 2, wherein a width of the boundary line in the region of the tube region is wider than a width of the boundary line in the reagent receiving region.

4. The film bag according to claim 1, wherein one or more of:
   the film bag bottom has a length of between one and forty millimeters,
   the reagent receiving length is between five and one hundred millimeters,
   the tube length is between two and one hundred millimeters, and
   the boundary line in the tube region has a width of between two hundred micrometers and twenty millimeters.

5. The film bag according to claim 1, wherein the fluid is accommodated in the reagent receiving region.

6. A microfluidic analysis system, comprising:
   a container with at least one first tube chamber and a second tube chamber arranged adjacent to the first tube chamber;
   at least one first film bag, the first film bag including:
   a first film bag bottom,
   a first film bag opening arranged opposite the first film bag bottom, and
   a first peel seam defining a first predetermined breaking point at a location between the first film bag bottom and the first film bag opening, the first peel seam configured to define at least in part (i) a first closed reagent receiving region between the first peel seam and the first film bag bottom, and (ii) a first tube region between the first peel seam and the first film bag opening,
   wherein the first film bag is configured such that when a fluid is in the first closed reagent receiving region and the first peel seam is released at the first predetermined breaking point, the first closed reagent receiving region is opened at the first predetermined breaking point and the fluid is directed from the first reagent receiving region through the first predetermined breaking point and then through the first tube region and then out of the first film bag through the first film bag opening,
   wherein the first reagent receiving region has a first reagent receiving length extending between the first peel seam and the first film bag bottom, wherein the first tube region has a first tube length extending between the first peel seam and the first film bag opening, the first tube length being at least five percent of the first reagent receiving length; and
   a second film bag arranged adjacent to the first film bag, the second film bag including:
   a second film bag bottom,
   a second film bag opening arranged opposite the second film bag bottom, and
   a second peel seam defining a second predetermined breaking point at a location between the second film bag bottom and the second film bag opening, the second peel seam configured to define in part (i) a second closed reagent receiving region between the second peel seam and the second film bag bottom, and (ii) a second tube region between the second peel seam and the second film bag opening,
   wherein the second reagent receiving region has a second reagent receiving length extending between the second peel seam and the second film bag bottom, wherein the second tube region has a second tube length extending between the second peel seam and the second film bag opening, the second tube length being at least five percent of the second reagent receiving length,
   wherein at least one subsection of the first tube region of the first film bag, which subsection surrounds the first film bag opening, is accommodated by the first tube chamber,
   wherein at least one subsection of the second tube region of the second film bag, which subsection surrounds the second film bag opening, is accommodated by the second tube chamber, and
   wherein the first reagent receiving region of the first film bag and the second reagent receiving region of the second film bag are arranged outside the first and second tube chambers.

7. The analysis system according to claim 6, further comprising:
   a further tube chamber arranged between the first tube chamber and the second tube chamber; and
   a further film bag arranged between the first film bag and the second film bag, the further film bag including:
   a further film bag bottom,
   a further film bag opening arranged opposite the further film bag bottom, and
   a further peel seam defining a further predetermined breaking point at a location between the further film bag bottom and the further film bag opening, the further peel seam configured to define at least in part (i) a further closed reagent receiving region between the further peel seam and the further film bag bottom, and (ii) a further tube between the further peel seam and the further film bag opening, wherein the further reagent receiving region has a further reagent receiving length extending between the further peel seam and the further film bag bottom, wherein the further tube region has a further tube length extending between the further peel seam and the further film bag opening, the further tube length being at least five percent of the further reagent receiving length, wherein at least one subsection of the further tube region of the further film bag, which subsection surrounds the further film bag opening, is accommodated by the further tube chamber, and wherein the further tube length of the further film bag has a shorter length than the first tube length of the first film bag and the second tube length of the second film bag.

8. The analysis system according to claim 6, further comprising a punch device configured to exert a force on at least one of the reagent receiving regions, the force configured to build up a pressure, which is configured to release the peel seam at the predetermined breaking point, in the interior of the at least one reagent receiving region, as a result of which the fluid is configured to flow through the tube region associated with the at least one of the reagent receiving regions into the tube chamber.

9. The analysis system according to claim 6, wherein:
the container has a storage chamber with a bottom and a punch opening, which is arranged opposite the bottom, for the introduction of a punch of a punch device,
wherein the tube chambers open into the storage chamber via connecting openings, and
wherein the reagent receiving regions are arranged standing next to one another obliquely with respect to the bottom within the storage chamber.

10. The analysis system according to claim 9, further comprising an elastic membrane that closes the punch opening.

11. A method for producing a microfluidic analysis system, comprising:
arranging at least one first film bag adjacent to at least one second film bag, wherein:
the first film bag includes:
a first film bag bottom,
a first film bag opening arranged opposite the first film bag bottom, and
a first peel seam defining a first predetermined breaking point at a location between the first film bag bottom and the first film bag opening, the first peel seam configured to define at least in part (i) a first closed reagent receiving region between the first peel seam and the first film bag bottom, and (ii) a first tube region between the first peel seam and the first film bag opening,
wherein the first film bag is configured such that when a fluid is in the first closed reagent receiving region and the first peel seam is released at the first predetermined breaking point, the first closed reagent receiving region is opened at the first predetermined breaking point and the fluid is directed from the first reagent receiving region past the first predetermined breaking point and then through the first tube region and then out of the first film bag through the first film bag opening,
wherein the first reagent receiving region has a first reagent receiving length extending between the first peel seam and the first film bag bottom, wherein the first tube region has a first tube length extending between the first peel seam and the first film bag opening, the first tube length being at least five percent of the first reagent receiving length, and the second film bag includes:
a second film bag bottom,
a second film bag opening arranged opposite the second film bag bottom, and
a second peel seam defining a second predetermined breaking point at a location between the second film bag bottom and the second film bag opening, the second peel seam configured to define at least in part (i) a second closed reagent receiving region between the second peel seam and the second film bag bottom, and (ii) a second tube region between the second peel seam and the second film bag opening,
wherein the second reagent receiving region has a second reagent receiving length extending between the second peel seam and the second film bag bottom, wherein the second tube region has a second tube length extending between the second peel seam and the second film bag opening, the second tube length being at least five percent of the second reagent receiving length;
accommodating at least one subsection of the first tube region of the first film bag by a first tube chamber of a container, the subsection of the first tube region surrounding the first film bag opening, and
accommodating at least one subsection of the second tube region of the second film bag by a second tube chamber of the container, the second tube chamber arranged adjacent to the first tube chamber, the subsection of the second tube region surrounding the second film bag opening; and
arranging the reagent receiving region of the first film bag and the reagent receiving region of the second film bag outside the tube chambers.

12. The method according to claim 11, further comprising exerting a force on at least one of the reagent receiving regions to build up a pressure, which is configured to release the first peel seam at the first predetermined breaking point, in the interior of the at least one of the reagent receiving regions.

13. The film bag of claim 1, wherein:
the peel seam at the predetermined breaking point has a first length extending in a direction from the film bag bottom toward the film bag opening;
the tube length extends in the direction; and
the tube length is longer than the first length.

14. The microfluidic analysis system of claim 6, wherein:
the first peel seam has a first length at the first predetermined breaking point extending in a first direction from the first film bag bottom toward the first film bag opening;
the first tube length extends in the first direction;
the first tube length is longer than the first length;
the second peel seam has a second length at the second predetermined breaking point extending in a second direction from the second film bag bottom toward the second film bag opening;
the second tube length extends in the second direction; and
the second tube length is longer than the second length.

15. The method of claim 11, wherein:
the first peel seam has a first length at the first predetermined breaking point extending in a first direction from the first film bag bottom toward the first film bag opening;

the first tube length extends in the first direction;
the first tube length is longer than the first length;
the second peel seam has a second length at the second predetermined breaking point extending in a second direction from the second film bag bottom toward the second film bag opening;
the second tube length extends in the second direction; and
the second tube length is longer than the second length.

16. The method of claim 11, further comprising:
forming the first film bag with a boundary line extending from the first film bag bottom to the first film bag opening by folding a film.

17. The method of claim 11, further comprising:
forming the first film bag with a boundary line extending from the first film bag bottom to the first film bag opening by sealing a first film portion and a second film portion.

18. The film bag according to claim 1, wherein:
at least one film extends contiguously from the film bag opening first to the peel seam, then to the tube region, and then to the film bag bottom and defines the film bag opening, the tube region, and the film bag bottom.

19. The microfluidic analysis system of claim 6, wherein:
at least one film extends contiguously from the first film bag opening first to the first peel seam, then to the first tube region, and then to the first film bag bottom and defines the first film bag opening, the first tube region and the first film bag bottom.

* * * * *